Figure 1:
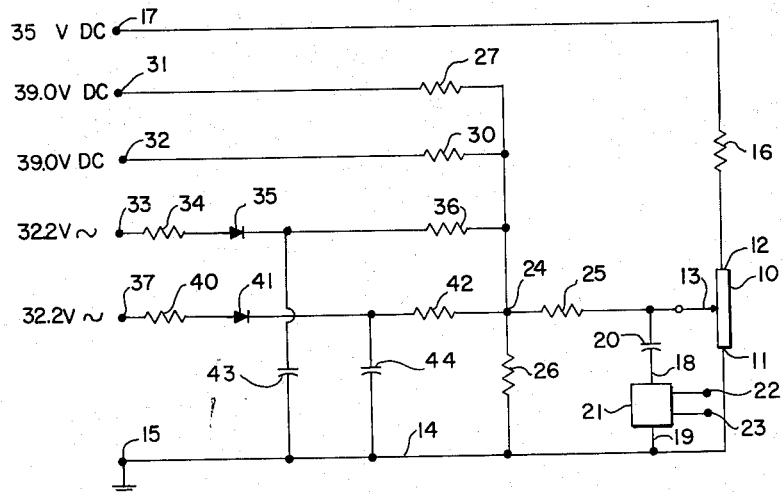

March 20, 1962     E. S. BEVILACQUA     3,026,505
UNIJUNCTION TRANSISTOR OSCILLATOR VOLTAGE MONITORING CIRCUIT
Filed Aug. 19, 1959

*INVENTOR*
ENRICO S. BEVILACQUA

BY Roger W. Jensen

*ATTORNEY*

United States Patent Office 3,026,505
Patented Mar. 20, 1962

3,026,505
UNIJUNCTION TRANSISTOR OSCILLATOR
VOLTAGE MONITORING CIRCUIT
Enrico S. Bevilacqua, Clearwater, Fla., assignor to Minneapolis-Honeywell Regulator Company, Minneapolis, Minn., a corporation of Delaware
Filed Aug. 19, 1959, Ser. No. 834,820
1 Claim. (Cl. 340—253)

This invention relates to control apparatus, and more particularly relates to voltage monitoring apparatus whereby a plurality of voltages may be monitored so as to detect an increase, decrease, or absence in any of the voltages being monitored.

In present day complex electronic equipment it is often necessary to have many independent voltage sources, or power supplies, to supply the needs of the many diverse circuits therein. There may be, for example, alternating current sources of different frequencies and voltages in addition to a plurality of D.C. supplies. The latter power supply may also vary in nominal voltage and degree of regulation.

In electronic equipment having such a plurality of voltage or power sources, it is often the case that failure of one, or possibly a few, of the sources will not be immediately apparent in the operation of the equipment, and will cause injury to some of its circuits. It is obvious therefore that it is desirable to have an immediate indication of any voltage failures and, in some cases, to have automatic means for shutting off the entire apparatus upon a voltage failure.

One of the simplest ways of monitoring a plurality of voltages is to have a plurality of relays, each of which is energized by one of the voltages. The relay contacts may then be connected to some form of indicator so that opening of any one of the relays gives a failure indication. Such a crude arrangement may be entirely satisfactory for some operations, but has several disadvantages. Some of these disadvantages include the excessive weight of the relays where the equipment is airborne and the insensitiveness to slight increases and decreases in the monitored voltages.

My invention, however, is sensitive, both to slight increases and slight decreases in the monitored voltages as well as complete failure. Further, weight of the apparatus embodying my invention may be considerably less than that employing relays.

My invention contemplates, briefly, the use of a unijunction transistor, or double-based diode, in a relaxation oscillator which is excited by a plurality of voltages. These voltages are the voltages to be monitored, and are applied through a summing or combining network to power the relaxation oscillator. Upon being supplied the correct voltages, the oscillator becomes operative, and upon relatively slight deviations from the proper voltages the oscillator becomes inoperative. Further means are provided for detecting the presence or absence of oscillations and for giving an indication thereof and/or actuating further protective circuitry.

It is therefore a general object of my invention to provide an improvement to voltage failure detectors.

It is another object of my invention to provide apparatus for monitoring a plurality of voltages to detect variations in the voltages beyond predetermined limits.

It is a further object of my invention to provide apparatus that is simple, accurate, versatile, and light in weight for monitoring a plurality of voltages to detect variations in the voltages beyond predetermined limits.

Figures 2, 4:
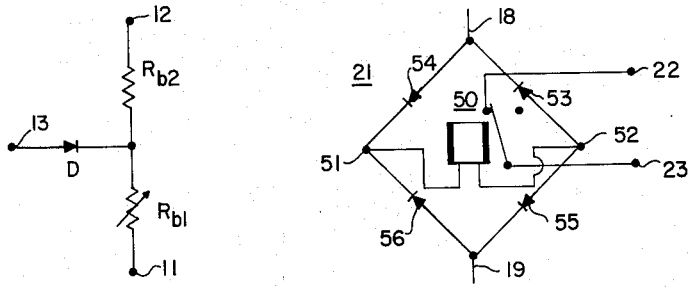
Figure 3:
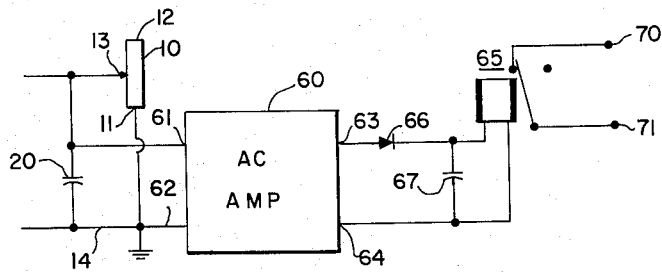

These and other objects of the present invention will become clear upon reference to the following specification, claim, and drawing, in which:

FIGURE 1 is a schematic representation of a circuit embodying my invention;
FIGURE 2 is a detailed schematic representation of an oscillation-detecting circuit of FIGURE 1;
FIGURE 3 is a schematic representation of an alternate oscillation-detecting circuit that may be used in conjunction with the circuit of FIGURE 1; and
FIGURE 4 is an equivalent circuit of a unijunction transistor.

Structure

In FIGURE 1, a unijunction transistor 10 has a first base electrode 11, a second base electrode 12 and an emitter electrode 13. The unijunction transistor 10 may be of the type shown and described in the I. A. Lesk Patent 2,769,926 which issued November 6, 1956. The first base electrode 11 is connected by means of a conductor 14 to an input terminal 15. Conductor 14 is connected to ground. The second base electrode 12 is connected through a resistor 16 to an input terminal 17. Connected in series between emitter electrode 13 and conductor 14 is a capacitor 20 and an oscillation detection circuit 21. Oscillation detection circuit 21 has two input terminals 18 and 19 as well as two output terminals 22 and 23. A resistor 25 is connected between emitter electrode 13 and a junction point 24. Another resistor 26 is connected between junction point 24 and conductor 14. Two further resistors 27 and 30 connect a pair of input terminals 31 and 32, respectively, to junction point 24. An input terminal 33 is connected through a resistor 34 to one side of a diode rectifier 35, the other side of which is connected through a resistor 36 to junction point 24. An input terminal 37 is connected through a resistor 40 to one side of a diode rectifier 41, the other side of which is connected through a resistor 42 to junction point 24. The junction of rectifier 35 and resistor 36 is connected through a filter capacitor 43 to conductor 14; likewise, the junction of diode rectifier 41 and resistor 42 is connected through a filter capacitor 44 to conductor 14.

FIGURE 2 shows the schematic of oscillation detection circuit 21. During operation, its output terminals 22 and 23 are connected across the normally closed contacts of a relay designated generally by the numeral 50. The winding of relay 50 is connected between the output terminals 51 and 52 of a full wave bridge rectifier. The bridge rectifier has a pair of diodes 53 and 54 connected in series between terminals 51 and 52 and also has a pair of diodes 55 and 56 connected in series between terminals 51 and 52. All of the diodes 53, 54, 55 and 56 are poled in a direction for easy current flow from terminal 52 to terminal 51. The junction between diodes 53 and 54 is connected, at input terminal 18, to capacitor 20, and the junction between diodes 55 and 56 is connected, at input terminal 19, to conductor 14, as found in FIGURE 1.

FIGURE 3 shows an alternate arrangement for detecting the presence or absence of oscillations. In this arrangement the oscillation detection circuit 21 is removed from the circuit of FIGURE 1 and capacitor 20 is connected directly between emitter 13 and conductor 14. An alternating current amplifier 60 has its input terminals 61 and 62 connected across capacitor 20 and has its output terminals 63 and 64 connected to energize a relay designated generally by the numeral 65. Specifically, output terminal 63 is connected through a diode rectifier 66 to one end of the winding of relay 65. Output terminal 64 is connected directly to the other end of the winding of relay 65, and a filter capacitor 67 is connected in parallel with the winding of relay 65. The normally closed contacts of relay 65 are connected across terminals 70 and 71.

Operation

The principles of operation of a unijunction transistor, when used in a relaxation oscillator is generally well known to those skilled in the art. However, a brief description will be given in order to make clear its application to a failure detector circuit.

An equivalent circuit of the unijunction transistor is shown in FIGURE 4 where 11 and 12 are designated as the two base points of the transistor and 13 is the emitter point. Between these three points, three components are connected as shown where a constant resistance $R_{b2}$ is connected in series with a variable resistor $R_{b1}$ and the remaining end of resistance $R_{b2}$ is connected to base point 12 and the remaining end of resistance $R_{b1}$ is connected to base point 11. The third component which is a diode D is connected between the junction of resistances $R_{b2}$ and $R_{b1}$ and emitter point 13. Resistance $R_{b1}$ exhibits a negative resistance characteristic, which for a given range of emitter load line, can create a bistable condition. Thus, an increase in current through the diode will rapidly decrease the resistance $R_{b1}$. Conversely, lowering the emitter current below a critical value, will restore the high resistance of $R_{b1}$. For a more complete and detailed description of the unijunction transistor, reference may be had to the aforementioned I. A. Lesk Patent 2,769,926.

By placing a condenser in parallel with emitter point 13 and base electrode 11, given conditions of base and emitter voltages will cause alternate charging and discharging of the capacitor. This type of current may be seen in FIGURE 1 where capacitor 20 is placed in parallel with emitter electrode 13 and base electrode 11 by passing current through oscillation detection circuit 21. By substituting a low impedance direct current ammeter, or an alternating current ammeter in conjunction with a rectifier, in place of the oscillation detector, and connecting the ammeter in series with the condenser 20, a current can be read on the ammeter revealing the oscillating condition of the unijunction transistor. In order to control an external circuit, the ammeter can be replaced with the coil of a sensitive relay such as relay 50 shown in FIGURE 2, or a transistor amplifier, such as found in FIGURE 3, which in turn can control one or several power circuits. Bearing this in mind, and referring to Table I for the values of components shown for a specific embodiment of the invention, a description of the operation of FIGURE 1 will now be given.

TABLE I

| Ref. Numeral | Description | Value |
| --- | --- | --- |
| 16 | Resistor | 1K ohms. |
| 20 | Capacitor | 0.56 Mf. |
| 25 | Resistor | 3.2K ohms. |
| 26 | do | 1,900 ohms. |
| 27, 30, 36, 42 | do | 10K ohms |
| 34, 40 | do | 10 ohms. |
| 43, 44 | Capacitor | 3.5 Mf. |
| 35, 41 | Diode IN 540 | |
| 10 | Unijunction Transistor 4JD5A1. | |
| 53, 54, 55, 56 | Diode IN 305 | |

In the embodiment of the invention which is shown in FIGURE 1, a 35 volt direct current is applied to input terminal 17 which is further applied to second base electrode 12 through resistor 16. Appearing on input terminals 33 and 37 are a pair of current signals of 32.2 volts in magnitude and appearing on input terminals 31 and 32 are a pair of direct current signals of 39.0 volts in magnitude. These voltages are all referenced to input terminal 15 which is connected to ground and the alternating voltages are rectified by the diode and filter capacitor combinations. All of the foregoing voltages with the exception of the voltage appearing on terminal 17 will be combined at junction point 24 to appear on emitter electrode 13. Normally, the relaxation oscillator is oscillating and the alternating current which is applied to the full wave rectifier or oscillation detection circuit 21 is rectified to produce a pulsating direct current signal that may be used to control a meter or a relay such as relay 50. The failure of any one of the voltages appearing on terminals 31, 32, 33 or 37 with respect to ground terminal 15, will cause current to stop flowing in oscillation detection circuit 21. In addition, the voltage which is applied to second base electrode 12 of unijunction transistor 10 will cause the oscillator to become inactive if the voltage fails. Further, the voltage applied to second base electrode 12 will stop oscillations when it increases above the allowable value as determined by the characteristics of operation of unijunction transistor 10. A loss of any of the direct current signals which appear at junction 24 results in an increased voltage drop across the remaining parallel group and a sufficient decrease in the voltage across resistor 26 to cause the oscillations to cease. During normal operation, an alternating voltage will appear across terminals 18 and 19 of oscillation detection circuit 21. For positive pulses appearing on terminal 19, it may be seen by referring to FIGURE 2, that current would be conducted through diode 56, through relay 50, and through diode 53 to terminal 18, to complete the current flow from terminal 19 to 18. During oscillations, when the positive pulse appears on terminal 18, current will flow through diode 54, relay 50, and diode 55 to terminal 19. Thus there is a pulsating direct current flowing through relay 50, keeping relay 50 energized during normal operation. Upon the absence of the alternating voltage across terminals 18 and 19, relay 50 will become de-energized and any protective circuit which is connected to terminals 22 and 23 may become energized or de-energized, as the case may be, to cut off power from the power supplies.

Another variation of the failure detector circuit is shown in FIGURE 3 whereby detection circuit 21 is removed from the failure detector, and replaced by an alternating current amplifier which is connected in parallel with capacitor 20.

The operation of the circuit shown in FIGURE 3 is similar to that of FIGURE 1 since an alternating current will appear at the input of amplifier 60 as long as oscillations are applied across capacitor 20. Therefore a voltage appears at the output of alternating current amplifier 60 to be rectified by diode 66, and the signal will appear across capacitor 67 to keep relay 65 energized during normal operation. Upon failure of any of the voltages in the circuit which will cause the oscillator to cease oscillations, and consequently relay 65 will be de-energized causing the circuit between terminals 70 and 71 to have an infinite resistance.

While I have shown certain specific embodiments of my invention it is understood that this is for the purpose of illustration only and that my invention is to be limited solely by the scope of the appended claim.

I claim:

In apparatus adapted to provide a control function when any one of a given set of voltages is lowered below a critical value or when another voltage is raised beyond a critical value: a unijunction transistor oscillator comprising a unijunction transistor having first and second base electrodes and an emitter electrode, capacitive means connected between said emitter electrode and said first base electrode, first impedance means connected at one end to said emitter electrode, second impedance means connected at one end to said second base electrode, said unijunction transistor oscillator operating to produce electrical oscillations upon the application of a first voltage between said first base electrode and the other end of said first impedance means and a second voltage between said first base electrode and the other end of said second impedance means, and said oscillator ceasing to produce oscillations when the ratio between the first and second voltages exceed predetermined limits; a plurality of voltage supplying means connected between said first base electrode and the other end of said first impedance means for applying therebetween variable potentials to be monitored for undervoltage; voltage supplying means connected between said first base electrode and said other end of said second impedance means for applying therebetween a variable potential to be monitored for overvoltage; and means connected to said oscillator for detecting the presence and absence of electrical oscillations produced therein as an indication of the overvoltage or undervoltage of said voltage supplying means.

References Cited in the file of this patent

UNITED STATES PATENTS

| | | |
|---|---|---|
| 2,623,176 | Witsenburg et al. | Dec. 23, 1952 |
| 2,780,752 | Aldrich et al. | Feb. 5, 1957 |
| 2,826,696 | Suran | Mar. 11, 1958 |